US012045369B2

(12) United States Patent
Mondal et al.

(10) Patent No.: US 12,045,369 B2
(45) Date of Patent: Jul. 23, 2024

(54) SYSTEM AND METHOD FOR DATA RESIDENCY COMPLIANT DATA PLACEMENT IN CLOUD

(71) Applicant: Tata Consultancy Services Limited, Mumbai (IN)

(72) Inventors: Sutapa Mondal, Pune (IN); Shubhro Roy, Kolkata (IN); Pankaj Kumar Sahu, New Delhi (IN); Arun Ramamurthy, Pune (IN); Mangesh Sharad Gharote, Pune (IN); Sachin Premsukh Lodha, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 218 days.

(21) Appl. No.: 17/824,968

(22) Filed: May 26, 2022

(65) Prior Publication Data

US 2023/0274022 A1 Aug. 31, 2023

(30) Foreign Application Priority Data

Feb. 28, 2022 (IN) .............................. 202221010820

(51) Int. Cl.
G06F 21/62 (2013.01)
H04L 67/1095 (2022.01)
H04L 67/1097 (2022.01)

(52) U.S. Cl.
CPC ...... *G06F 21/6245* (2013.01); *G06F 21/6236* (2013.01); *H04L 67/1095* (2013.01); *H04L 67/1097* (2013.01)

(58) Field of Classification Search
CPC ............. G06F 21/6245; G06F 21/6236; G06F 3/0605; G06F 3/0631; G06F 3/0653;
(Continued)

(56) References Cited

U.S. PATENT DOCUMENTS 8,447,732 B2 5/2013 Nagpal et al.
10,567,234 B1 2/2020 Todd et al.
(Continued)

FOREIGN PATENT DOCUMENTS

CN 108781220 B 5/2021

OTHER PUBLICATIONS

K. Singi, K. K. Phokela, N. Sukhavasi and V. Kaulgud, "Framework for Recommending Data Residency Compliant Application Architecture," 2021 28th Asia-Pacific Software Engineering Conference (APSEC), Taipei, Taiwan, 2021, pp. 542-546. (Year: 2021).*
(Continued)

*Primary Examiner* — Joseph P Hirl
*Assistant Examiner* — Thomas A Gyorfi
(74) *Attorney, Agent, or Firm* — Finnegan, Henderson, Farabow, Garrett & Dunner, LLP

(57) ABSTRACT

Existing data residency compliance techniques suffer from inherent drawbacks to discover the spread of data, understanding the data residency regulations and semantics behind them and most importantly placement of data in cloud datacenters such that it is data residency compliant. Embodiments herein provide a method and system for optimizing placement of data to a cloud datacenter complying data residency regulations. The system selects one serving cloud datacenter for a user center. The selection considers three conflicting objectives such as minimum data placement cost, provide good quality of service (i.e. latency) and to comply with data residency regulations. The system essentially covers data residency compliance problem in three phases namely, violation detection, decision support and recommendation. Herein, the system trades-offs latency with data placement cost. Further, the system considers user center location, determined violation of data residency regu-
(Continued)

lations, cost of movement from one datacenter to another, and a predefined threshold latency.

9 Claims, 8 Drawing Sheets

(58) Field of Classification Search
CPC ........ G06F 3/067; G06F 16/21; G06F 9/5072; G06Q 50/18; G06Q 10/0635; G06Q 10/06395; G06Q 50/26; H04L 67/1095; H04L 67/1097
See application file for complete search history.

(56) References Cited

U.S. PATENT DOCUMENTS

| | | | | |
|---|---|---|---|---|
| 10,831,929 | B2* | 11/2020 | Spaulding | ........... H04L 63/0407 |
| 10,963,294 | B2* | 3/2021 | Fornash | ................ G06F 9/5077 |
| 11,748,496 | B1* | 9/2023 | Philbrick | ............... G06Q 50/18 |
| | | | | 726/29 |
| 2010/0318658 | A1* | 12/2010 | Zorn | ..................... G06F 9/5066 |
| | | | | 709/226 |
| 2020/0076811 | A1* | 3/2020 | Rudden | ................... G06F 21/53 |
| 2020/0356536 | A1 | 11/2020 | Nilsson | |
| 2020/0382593 | A1* | 12/2020 | Ghabour | ................. H04L 67/10 |
| 2022/0172222 | A1* | 6/2022 | Chin | ....................... H04L 67/53 |
| 2022/0247666 | A1* | 8/2022 | Roersma | ............ H04L 63/0272 |

OTHER PUBLICATIONS

C. R. Baudoin, "The Impact of Data Residency on Cloud Computing," 2018 32nd International Conference on Advanced Information Networking and Applications Workshops (WAINA), Krakow, Poland, 2018, pp. 430-435. (Year: 2018).*

Rao et al., "Data residency as a service: a secure mechanism for storing data in the cloud," Int. J. Embedded Systems, 11(4), (2019).

* cited by examiner

SYSTEM AND METHOD FOR DATA RESIDENCY COMPLIANT DATA PLACEMENT IN CLOUD

CROSS-REFERENCE TO RELATED APPLICATIONS AND PRIORITY

This U.S. patent application claims priority under 35 U.S.C. § 119 to Indian Application No. 202221010820, filed on Feb. 28, 2022. The entire contents of the aforementioned application are incorporated herein by reference.

TECHNICAL FIELD

The disclosure herein generally relates to the field of data placement in cloud and more specifically, to a method and system for optimizing placement of data to at least one of a plurality of cloud datacenters complying data residency.

BACKGROUND

With the global expansion of business, enterprises need to serve customers across various geographies. For this purpose, transfer of data outside the borders of a country has become inevitable. But the governments of various countries are enacting different regulations to restrict the flow of data within the borders of the country (data localization). The most common reasons cited for data localization are security against unintended access and a desire to boost economy by helping local companies to set up infrastructure for handling data. However, strict compliance with restrictions on the free flow of data has hampered business and research for enterprises.

Data residency is one of the important regulations that organizations need to comply with in order to operate in various countries. Data residency is set of issues and practices related to the location of data and metadata, movement of (meta) data across geographies and jurisdictions, and protection of that (meta) data against unintended access and other location-related risks. Once the data is with the Cloud Service Providers (CSPs) a lot of control over data is handed over to them in managing the storage and processing of data. Thus, organizations must be vigilant and responsive to take decisions on where their data should be placed and processed governing to the data residency regulations and privacy-security aspects of data. Violation of data residency laws have often resulted in heavy penalties for enterprises in the form of fines, loss of business privileges or reputation.

For data residency compliance the main issue lies with discovering the spread of data, understanding the regulations and semantics behind them and most importantly placement of data in cloud datacenters such that it is data residency compliant.

SUMMARY

Embodiments of the disclosure present technological improvements as solutions to one or more of the above-mentioned technical problems recognized by the inventors in conventional systems. For example, in one embodiment, a method and system for optimizing placement of data to at least one of a plurality of cloud datacenters complying data residency is provided.

In one aspect, a processor-implemented method for optimizing placement of data to at least one of a plurality of cloud datacenters complying data residency is provided. The method includes one or more steps such as receiving a primary data and corresponding associated data hosted on one or more web-services which are spread across a plurality of data centers across one or more countries, and analyzing the received primary data to determine locale corresponding to each of the primary data based on at least one of nationality, residence, and subject to jurisdiction. Further, the received associated data corresponding to each of the primary data is analyzed to determine nature of the associated data. The nature of the associated data includes Personal Identifiable Information (PII), financial data, healthcare data, telecom data, and government data. One or more data residency regulations are fetched based on the identified locale of the primary data, the determined nature of the associated data and a user center location. Herein, the data residence regulations are conditional as well as unconditional depend on the nature of the associated data. Further, the method comprising assessing in-country, and out-country placement status of the received primary data and the associated data based on the fetched one or more data residency regulations to determine a violation of one or more data residency regulations. Finally, the placement of the received primary data and the associated data to at least one of the plurality of datacenters across one or more countries is optimized based on the user center location, the determined violation of one or more data residency regulations, cost of movement from one datacenter to another, and a predefined threshold latency.

In another aspect, a system for optimizing placement of data to at least one of a plurality of cloud datacenters complying data residency is provided. The system includes an input/output interface configured to receive a primary data and corresponding associated data hosted on one or more web-services which are spread across a plurality of data centers across one or more countries, one or more hardware processors and at least one memory storing a plurality of instructions, wherein the one or more hardware processors are configured to execute the plurality of instructions stored in the at least one memory.

Further, the system is configured to analyze the received primary data to determine locale corresponding to each of the primary data based on at least one of nationality, residence, and subject to jurisdiction, analyze the received associated data corresponding to each of the primary data to determine nature of the associated data, fetch one or more data residency regulations based on the identified locale of the primary data, the determined nature of the associated data and a user center location and optimize the placement of the received primary data and the associated data to at least one of the plurality of datacenters across one or more countries based on the user center location, the determined violation of one or more data residency regulations, cost of movement from one datacenter to another, and a predefined threshold latency.

In yet another aspect, one or more non-transitory machine-readable information storage mediums are provided comprising one or more instructions, which when executed by one or more hardware processors causes a method for optimizing placement of data to at least one of a plurality of cloud datacenters complying data residency is provided. The method includes one or more steps such as receiving a primary data and corresponding associated data hosted on one or more web-services which are spread across a plurality of data centers across one or more countries, and analyzing the received primary data to determine locale corresponding to each of the primary data based on at least one of nationality, residence, and subject to jurisdiction. Further, the received associated data corresponding to each of the primary data is analyzed to determine nature of the associated data. The nature of the associated data includes Personal Identifiable Information (PII), financial data, healthcare data, telecom data, and government data. One or more data residency regulations are fetched based on the identified locale of the primary data, the determined nature of the associated data and a user center location. Herein, the data residence regulations are conditional as well as unconditional depend on the nature of the associated data. Further, the method comprising assessing in-country, and out-country placement status of the received primary data and the associated data based on the fetched one or more data residency regulations to determine a violation of one or more data residency regulations. Finally, the placement of the received primary data and the associated data to at least one of the plurality of datacenters across one or more countries is optimized based on the user center location, the determined violation of one or more data residency regulations, cost of movement from one datacenter to another, and a predefined threshold latency.

It is to be understood that the foregoing general descriptions and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
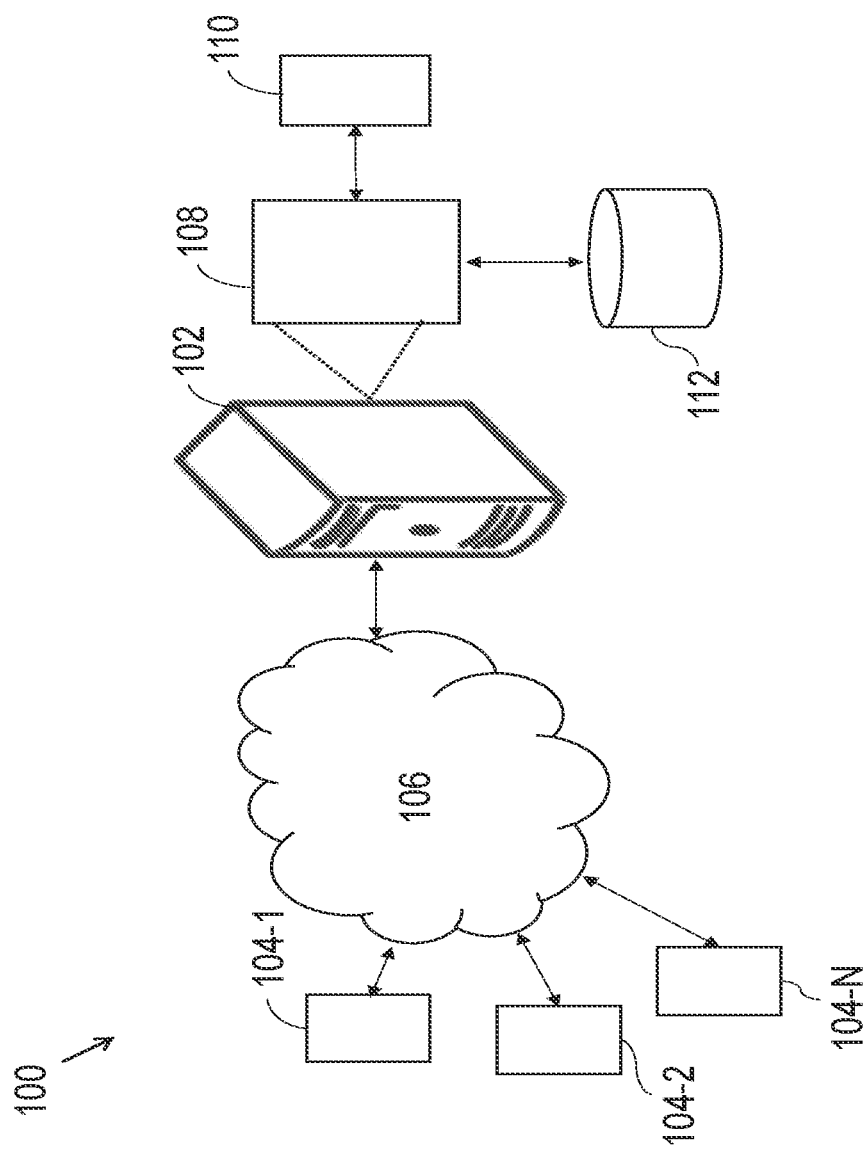
FIG. 1 illustrates a block diagram of an exemplary system for optimizing placement of data to at least one of a plurality of cloud datacenters complying data residency, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a method and system for optimizing placement of data to at least one of a plurality of cloud datacenters complying data residency. The method and system provide decision-aid for data placement in cloud such that overall operational cost is minimal and data residency regulations are met. Though the key decision is placement of the data in cloud datacenter, there are multiple sub-problems such as data discovery, regulations mapping, compliance check and decision support that needs to be addressed.

It is to be noted that with the global expansion of business, enterprises need to serve customers across various geographies. For this purpose, transfer of data outside the borders of a country has become inevitable. But governments of countries are enacting different regulations to restrict the flow of data within the borders of the country (data localization). However, strict compliance with restrictions on the free flow of data has hampered business and research for enterprises.

Some countries adopt conditional cross-border data transfer regulations i.e., if the prescribed conditions are satisfied then organizations are allowed to operate. European Union allows conditional data transfer, adhering to General Data Protection Regulation (GDPR). Some countries follow a sectoral attitude towards data transfer i.e., localizing only a particular type of data. For example, Australia localizes health data, Germany localizes telecommunications data and South Korea localizes map data related to its citizens. Some countries require a local copy to be stored in the host country before data is transferred outside its authority like India requires a local backup of all financial data before being transferred oversea. Though, there are some countries have bilateral or multilateral agreements that allows free flow of the data access and transfers. Thus, understanding the data residency regulations is complex and implementing it into practice is a challenge. The data residency challenges are summarized as follows:

I. Inconsistent Regulations: The data residency regulations vary from country to country.

II. Diverse Data: The regulations may vary according to type of data which makes it complicated for cross border data transfer.

III. Stringent Data Localization, conditional and unconditional data transfer: As discussed above, varied criteria increase the problem complexity and makes it challenging for organization to adapt.

IV. Document-centric nature of the regulations makes it extensive to follow and difficult to comply.

V. Regulations may change over time: The data residency regulations at any point in time can change for a country. This requires the organizations to be responsive to act.

Existing systems mainly focus upon data provenance and data storage issues with regard to securely sharing data, tracking data provenance, and maintaining audit logs. However, none of the systems particularly focus upon the data residency issue. Data residency issue is challenging because there is no fixed set of regulations that apply for all the countries and every kind of data type. Thus, this necessitates the need for a consulting tool which suggests optimal data placement strategies considering the setup cost, service latency, data residency compliance, security, back up, etc. Therefore, the system and method are proposed for optimizing placement of data to at least one of a plurality of cloud datacenters complying data residency to overcome these challenges and help the organizations to deal with data residency compliance.

It is to be noted that the data herein is not limited to personal identifiable information (PII) or personal health information (PHI) or generally to data covered by data protection regulations that focus on privacy of individuals rather the type of data coverage is much broader for data residency. It includes, data about telecommunications, payment card industry, government information, trade controls, military information, natural resources information, marine geological data etc. This delineates that data residency is not the same as data privacy even though they are related. For example, an organization dealing with hospital data of the citizen of country X, may keep its data within its own premise located within the same country X, in such a scenario data residency regulations are not violated, but it may still violate privacy, if data is not protected.

Referring now to the drawings, and more particularly to FIG. 1 through FIG. 8, where similar reference characters denote corresponding features consistently throughout the figures, there are shown preferred embodiments and these embodiments are described in the context of the following exemplary system and/or method.

FIG. 1 illustrates a block diagram of a system (100) for optimizing placement of data to at least one of a plurality of cloud datacenters complying data residency, in accordance with an example embodiment. Although the present disclosure is explained considering that the system (100) is implemented on a server, it may be understood that the system (100) may comprise one or more computing devices (102), such as a laptop computer, a desktop computer, a notebook, a workstation, a cloud-based computing environment and the like. It will be understood that the system (100) may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee, and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. Further, the system (100) comprises at least one memory with a plurality of instructions, one or more databases (112), and one or more hardware processors (108) which are communicatively coupled with the at least one memory to execute a plurality of modules (114) therein. The components and functionalities of the system (100) are described further in detail.

Figure 2:
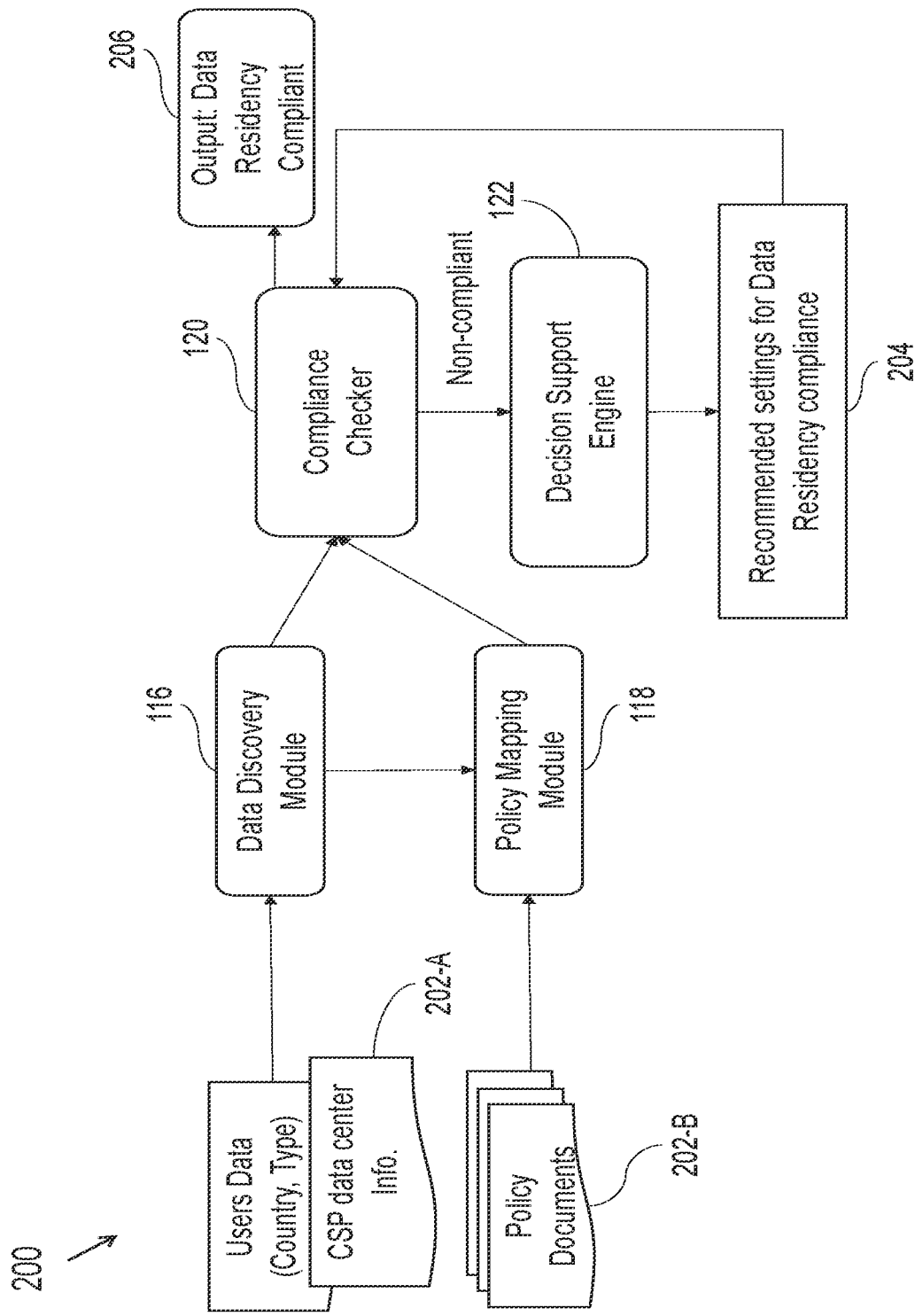
FIG. 2 is a functional block diagram of the system for data residency compliance, in accordance with some embodiments of the present disclosure.

Referring FIG. 2, illustrates a block diagram (200) of the system (100) for data residency compliance. It would be appreciated the system is configured to select at least one serving cloud datacenter for each user center of a web application. The selection considers three conflicting objectives such as minimum cost, provide good quality of service such as latency and to comply with the data residency. Herein, the one or more I/O interfaces (104) are configured to receive a primary data and corresponding associated data hosted on one or more web-services which are spread across a plurality of data centers across one or more countries. Herein, the primary data comprises of customers data, employees data, vendors information.

Furthermore, the input to the system (100) includes the user center locations, cloud datacenter locations, the cloud datacenter service cost and latency between the user center and cloud center. The output of the system (100) is the assignment of user centers to cloud datacenters. For the optimized placement, the system (100) considers the user center location, the determined violation of one or more data residency regulations, cost of movement from one datacenter to another, and a predefined threshold latency.

In another embodiment, the system (100) comprises a data discovery module (116) that recognizes the primary data and corresponding associated data hosted on one or more web-services which are spread across a plurality of data centers across one or more countries. Herein, the primary data comprises of customers data, employees data, and vendors information. Further, the data discovery module (116) of the system (100) is configured to drive users data i.e. the countries in which users are present and the type of data or service they access. Information about Cloud Service Providers (CSPs) and their data centers is also fetched using the data discovery module (116) of the system (100).

It would be appreciated that there are three stakeholders such as data owner (i.e. individuals/end-users), data custodian (i.e. the organization who holds the data) and the cloud service providers (CSPs). The CSPs provide multiple options for the data placement and security services to comply with the data residency regulations, but the final decision remains with the data custodian. The data custodian is held accountable for any kind of data privacy breach or regulatory compliance violation. Thus, the data custodian needs to make several decisions, starting from selecting the cloud service provider to placing the diverse types of data in an appropriate cloud data centers.

In another embodiment, the system (100) is configured to analyze the received primary data to determine locale corresponding to each of the primary data based on at least one of nationality, residence, and subject to jurisdiction. Further, the system (100) analyzes the received associated data corresponding to each of the primary data to determine nature of the associated data. It is to be noted that the nature of the associated data includes a Personal Identifiable Information (PII), a financial data, a healthcare data, a telecom data, and government data. Depending on these inputs the system (100) categorizes the data as a tuple (data, data-type, in-country, out-country). The data in tuple represents the actual data or record, data-type denotes the kind of data (financial, healthcare, sensitive information etc.), in-country indicates the location to which data originally belongs and out-country indicates the location where it currently resides.

In yet another embodiment, a policy mapping module (118) of the system (100) is configured to fetch one or more data residency regulations based on the identified locale of the primary data, the determined nature of the associated data and a user center location. It is to be noted that the data residence regulations are conditional as well as unconditional depend on the nature of the associated data. The policy mapping module (118) is responsible for identifying the data residency clauses as per the type of data given the in-country and out-country status of it. It would be appreciated that the data residency clauses can be captured in the form of ontologies which conceptualize the data residency clauses.

The system (100) essentially covers the data residency compliance problem in three phases namely, violation detection, decision support and recommendation. The violation detection is responsible for identifying whether an organization has violated the data residency regulations. Thus, depending on the type of data, its residing regions, and regulations as identified by the policy mapping module (118), a compliance checker (120) of the system (100) identifies the regulations which are being violated. In case of violation the compliance checker (120) of the system (100) generates a non-compliance report that indicates the regions which are non-complaint, else its shows a compliance status.

In another embodiment, the system (100) comprises a decision support engine (122) to provide decision-aid to the data custodian in making multiple decision pertaining to the placement of data such that overall cost is minimal and data residency regulations are not violated. The decision support engine (122) comprises optimization technique to assess in-country, and out-country placement status of the received primary data and the associated data based on the fetched one or more data residency regulations to determine a violation of data residency regulations. Further, the decision support engine (122) optimizes the placement of the received primary data and the associated data to at least one of the plurality of datacenters plurality of data centers across one or more countries based on the user center location, the determined violation of data residency regulations, cost of movement from one datacenter to another, and a predefined threshold latency.

Figure 3:
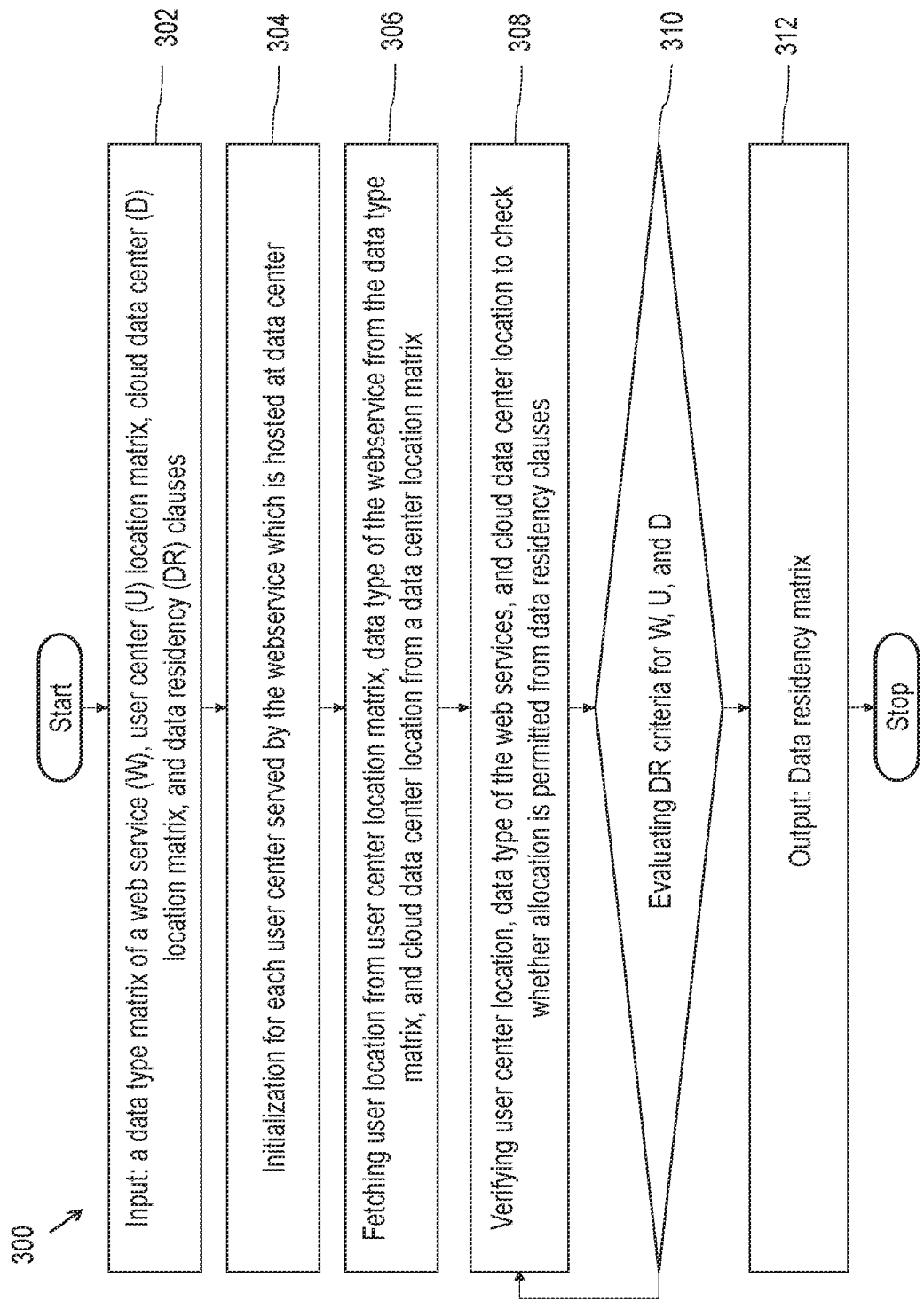
FIG. 3 is a flow diagram to determine a data residency matrix based on user center location, data type of the web services, and cloud data center location, in accordance with some embodiments of the present disclosure.

Referring FIG. 3, a flow diagram (300) to determine a data residency matrix based on user center location, data type of the web services, wherein considering a set of countries ($C_1$, $C_2$, . . . , $C_n$), where user centers and cloud datacenters are located. Each country has its own set of data residency regulations which could be conditional or unconditional or have data transfer agreements, for different types of data. Herein, all values of $\beta_{ijk}$ are derived to decide whether data residency regulations permit web service $W_k$ for serving user center $U_i$ to be hosted in cloud center location $A_j$. The one or more data residency regulations for the countries are stored in an input three dimensional (3D) matrix as Reg[c][r][t], where c is the total number of countries considered r is the total number of different of data residency regulation attributes like Strict Localization, Conditional Transfers, Agreements, etc., and t is the total number of data types like personal data, finance data, telecommunication data, Government data and others. A function func is used to determine whether one or more data residency regulations permit hosting a web service for handling a data type of users from a country in a given cloud data center. This function leads to final data residency regulation output $\beta_{ijk}$.

In one illustration, wherein the system (100) assists the organizations in deciding the cloud data center locations for hosting its web applications. The challenge is to select data centers from n locations for m user centers, accessing the s web services, such that the overall cost is minimal, quality of service (QoS) is high and one or more data residency regulations are compliant. The first objective $f_1$ minimize the total deployment cost which is the function of number of user centers using a web service at a location. The objective function could be linear or non-linear (e.g. tiered pricing). The second objective $f_2$ minimizes the overall latency i.e. response time of a service. Another constraint ensures that every user center of a web-service is served by exactly one data center.

$$\text{minimize } f_1 = \Sigma_k \Sigma_j D_{kj}(\Sigma_i y_{ijk} F_{ik}) \quad (1)$$

$$\text{minimize } f_2 = \Sigma_i \Sigma_j \Sigma_k F_{ik} L_{ij} y_{ijk} \quad (2)$$

$$\Sigma_j y_{ijk} = \alpha_{ik} \forall i \text{ and } k \quad (3)$$

$$y_{ijk} \leq \beta_{ijk} \forall i, j \text{ and } k$$

$$yijk \in \{0,1\} \forall i, j \text{ and } k$$

wherein,
$U_i$—$i^{th}$ user center
$A_j$—$j^{th}$ cloud location
$W_k$—$k^{th}$ web service
$F_{ik}$—invocation frequency of web service $W_k$ at user center $U_i$
$L_{ij}$—latency between user center $U_i$ and cloud location $A_j$
$D_{kj}$—deployment cost function at cloud location $A_j$ for web service $W_k$
$\alpha_{ik}$—Parameter which takes value 1 if user center $U_i$ uses the web service $W_k$
$\beta_{ijk}$—Data Residency criteria, which takes value 1, if one or more data residency regulations allow serving of user center $U_i$ by cloud center $A_j$ for web service $W_k$, 0 otherwise.
$y_{ijk}$—Decision variable takes value 1 if user center $U_i$ uses cloud location $A_j$ for web service $W_k$, 0 otherwise.

Figure 4:
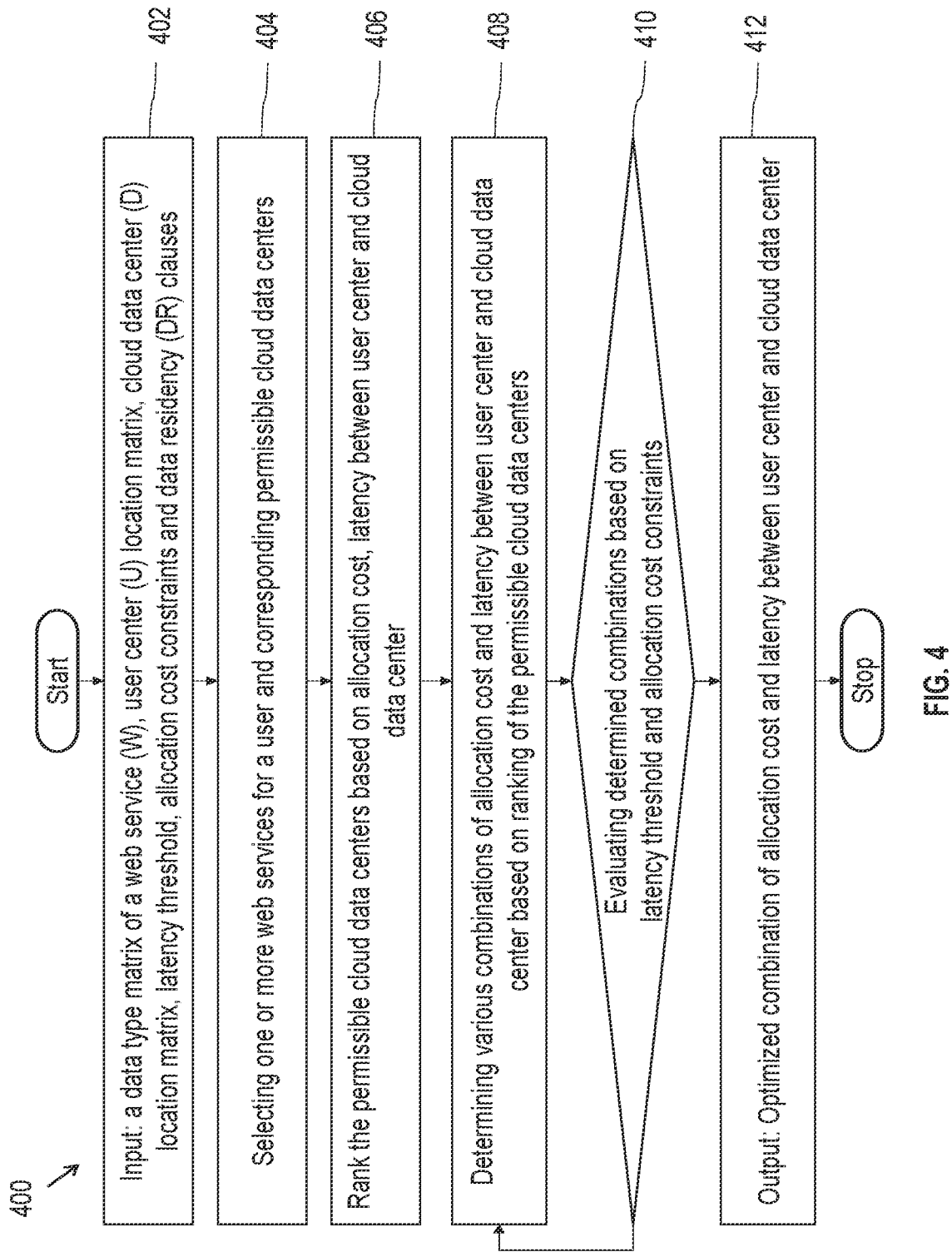
FIG. 4 is a flow diagram to determine an optimized combination of allocation cost and latency between user center and cloud data center, in accordance with some embodiments of the present disclosure.

Referring FIG. 4, illustrating a flow diagram (400) to determine an optimized combination of allocation cost and latency between user centers and cloud data centers in accordance with some embodiments of the present disclosure. The input to the system (100) would be the data residency parameter ($\beta_{ijk}$), the list of all user centers $U_i$, web services $W_k$ and cloud center location $A_j$, allocation cost, frequency, latency matrices, latency threshold, and allocation budget. For each user center, the system (100) obtains the list of data residency and low latency data centers where the web services serving the user center can be hosted. These data centers are ranked based on allocation cost, and latency using a ranking function to select data center with better rank. Iteratively the list of compliant data centers for hosting web services serving each user center are obtained. Further, the system (100) generates one or more allocation combinations. Wherein each allocation combination can be described as hosting each web service serving a user center to any one permissible data center and web services serving the user centers are hosted in cloud data centers. Though, each generated combination is a solution to the allocation problem. However, the combination having total cost higher than the predefined budget is discarded similarly the combination having latency more than the predefined threshold value would also be discarded. A best combination in terms of the allocation cost and latency is chosen as an initial allocation combination. However, there may be non-dominated combinations wherein the latency is considered as a constant and the combination with a lowest cost is selected. The CSPs maintains a tiered-pricing model at the cloud datacenters.

Figure 5:
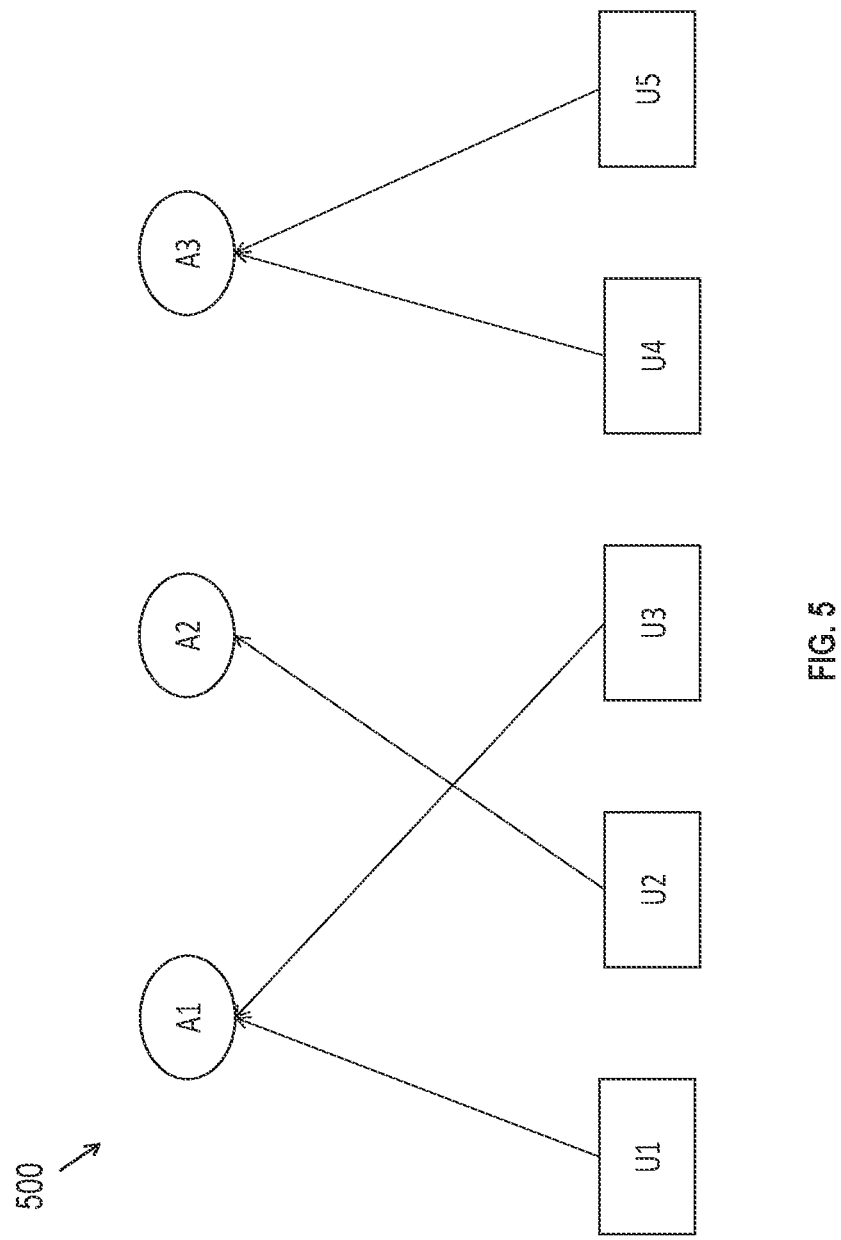
FIG. 5 is a schematic diagram to illustrate an optimized combination of allocation cost and latency between user center and cloud data center, in accordance with some embodiments of the present disclosure.

In one example, wherein cost at each data center is 3.5 unit/hour for A1 and A3. The cost at user center A2 is 2 unit/hour. However, if the web service serving customer U2 is migrated to data center A1 or A3, then cost at that data center would be raised by 1.5 unit/hour whereas the cost of hosting it alone at A2 raises the cost by 2 unit/hour as shown in FIG. 5.

Figure 6:
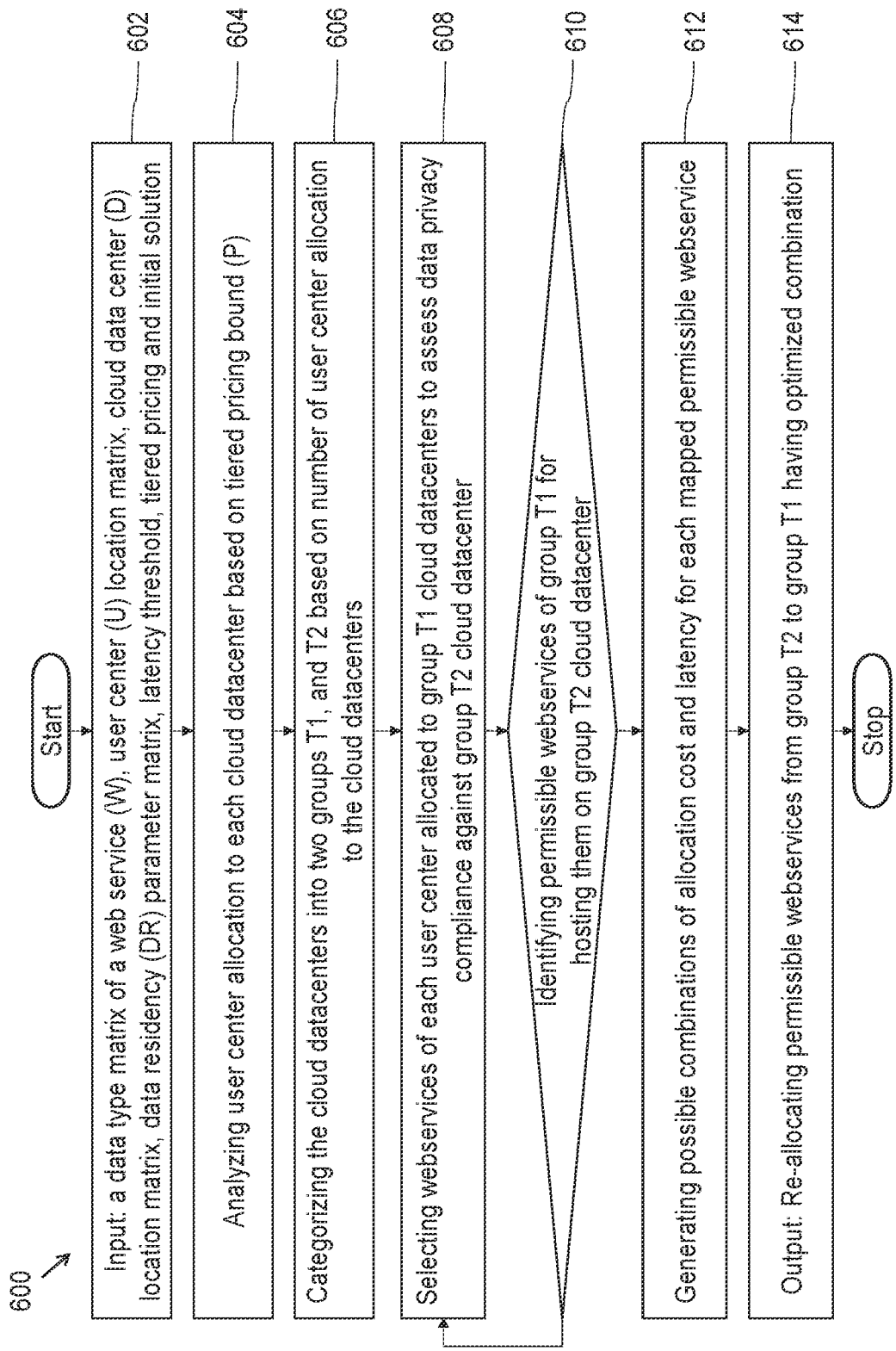
FIG. 6 is a flow diagram illustrating re-allocation of permissible webservices from one datacenter to another, in accordance with some embodiments of the present disclosure.
Figure 7:
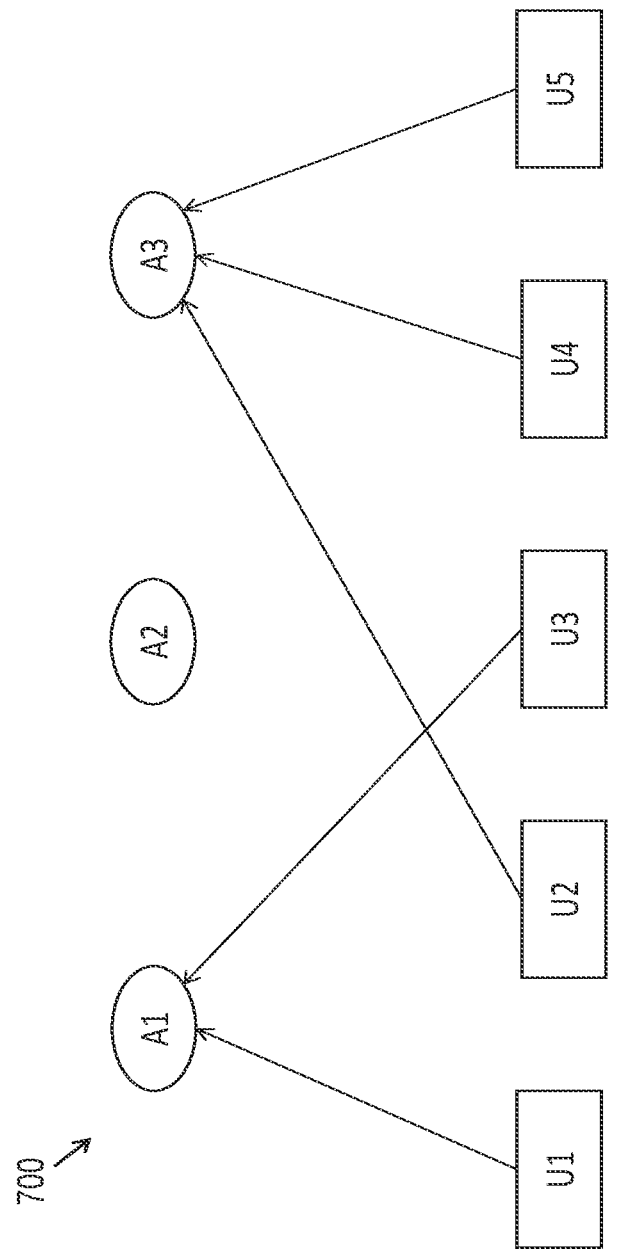
FIG. 7 is a block diagram illustrating re-allocation of permissible webservices from one datacenter to another, in accordance with some embodiments of the present disclosure.

Referring FIG. 6, a flow diagram (600) illustrating re-allocation of permissible webservices from one datacenter to another, in accordance with some embodiments of the present disclosure. Herein, the input to the system (100) is an initial sample combination of allocation cost and latency between user center and cloud data center, predefined latency threshold, and a tiered-pricing bound which decides the minimum number of web services that can be hosted to a data center, beyond which web service/(s) hosted to that data center requires migration. In the initial optimized combination, it is checked whether it is possible to divide the data centers into two group. First group (T1) having data centers with webservices allocated to it equal than the tiered pricing bound and a second group (T2) having data centers with webservices allocated to it equal to greater than the tiered pricing bound. Further, for each data center in T1, the list of data residency compliant and low latency data centers among T2 is obtained where the web services currently allocated (and serving different user centers) to this data center can be migrated. Iteratively such list of permissible data centers among T2 are obtained for all data centers in T1. Thus, several combinations can be generated where a combination can be described as each web service serving a user center previously allocated to a data center in T1 migrated to a data center in T2. A complete reallocation of all the web services previously allocated to a data center in T1 migrated to a data center in T2 as shown in FIG. 7. Therefore, each combination is reallocated solution with respect to the initial sample combination.

It is to be noted that the generating few data centers with no allocation after the reallocation procedure can be beneficial when new web services allocation demand arises, since these web services can be hosted to these currently unallocated data centers without overloading the other data centers or scaling up computational resources (cloud data centers). Herein, the decision-aid is required whenever data residency regulation changes, CSP introduces new data centers, enterprise offers new web services, or contract with CSPs is updated. Therefore, the system provides efficient repair strategies that would incur minimal migration (change in cloud configuration) and be data residency compliant.

Figure 8:
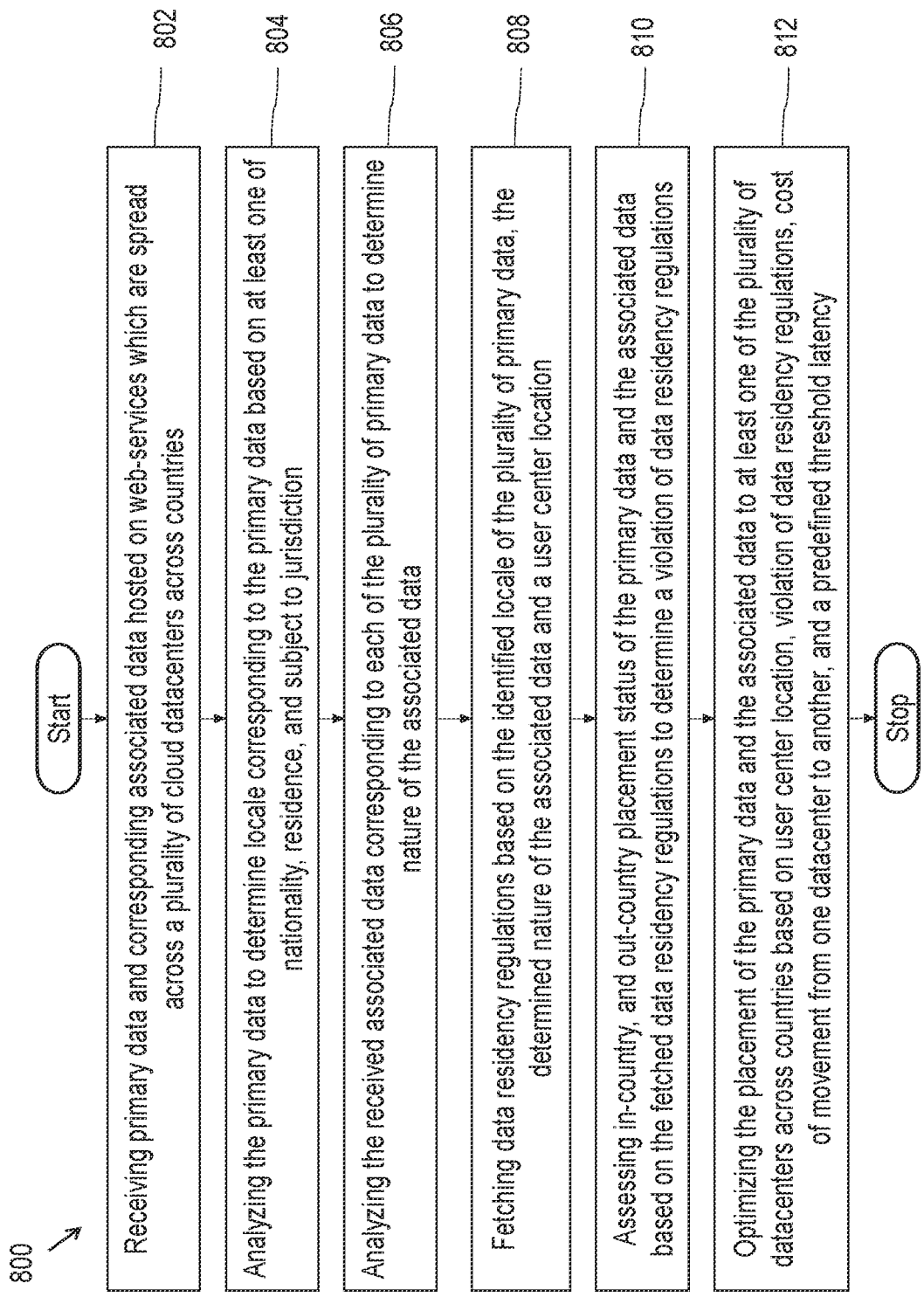
FIG. 8 is a flow diagram to illustrate a method for optimizing placement of data to at least one of a plurality of cloud datacenters complying data residency, in accordance with some embodiments of the present disclosure.

Referring FIG. 8, to illustrate a processor-implemented method (800) for optimizing placement of data to at least one of a plurality of datacenters complying one or more data residency regulations is provided.

Initially, at the step (802), receiving a primary data and corresponding associated data hosted on one or more webservices which are spread across a data centers across one or more countries. Herein, the primary data comprises of customers data, employees data, and vendors information.

At the next step (804), analyzing the received primary data to determine locale corresponding to primary data based on at least one of nationality, residence, and subject to jurisdiction.

At the next step (806), analyzing the received associated data corresponding to primary data to determine nature of the associated data, wherein the nature of the associated data includes Personal Identifiable Information (PII), financial data, healthcare data, telecom data, and government data.

At the next step (808), fetching one or more data residency regulations based on the identified locale of the primary data, the determined nature of the associated data and a user center location. The data residence regulations are conditional as well as unconditional depend on the nature of the associated data.

At the next step (810), assessing in-country, and out-country placement status of the received primary data and the associated data based on the fetched one or more data residency regulations to determine a violation of one or more data residency regulations.

At the last step (812), optimizing the placement of the received primary data and the associated data to at least one of the plurality of datacenters plurality of data centers across one or more countries based on the user center location, the determined violation of one or more data residency regulations, cost of movement from one datacenter to another, and a predefined threshold latency.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the need of data residency optimizing placement of data to at least one of a plurality of cloud datacenters complying data residency. The system is configured to select at least one serving cloud datacenter for each user center of a web application. The selection considers three conflicting objectives such as minimum data placement cost, provide good quality of service such as latency and to comply with the data residency. The system essentially covers the data residency compliance problem in three phases namely, violation detection, decision support and recommendation. Herein, the system trades-offs the latency with the data placement cost. Further, the system considers the user center location, the determined violation of one or more data residency regulations, cost of movement from one datacenter to another, and a predefined threshold latency.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context dearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

What is claimed is:

1. A processor-implemented method for optimizing placement of data to at least one of a plurality of cloud datacenters complying one or more data residency regulations comprising one or more steps of:
    receiving, via an input/output interface, a primary data and corresponding associated data hosted on one or more web-services which are spread across the plurality of cloud datacenters across one or more countries, wherein the primary data comprises of customers data, employees data, and vendors information;
    analyzing, via one or more hardware processors, the received primary data to determine a locale corresponding to the primary data based on at least one of nationality, residence, and subject to jurisdiction;
    analyzing, via the one or more hardware processors, the received associated data corresponding to the primary data to determine a nature of the associated data, wherein the nature of the associated data includes Personal Identifiable Information (PII), financial data, healthcare data, telecom data, and government data;
    fetching, via the one or more hardware processors, one or more data residency regulations based on the identified locale of the primary data, the determined nature of the associated data and a user center location, wherein the one or more data residency regulations are conditional as well as unconditional depending on the nature of the associated data;
    assessing, via the one or more hardware processors, in-country, and out-country placement status of the received primary data and the associated data based on the fetched one or more data residency regulations to determine a violation of one or more data residency regulations; and
    optimizing, via the one or more hardware processors, the placement of the received primary data and the associated data to at least one of the plurality of datacenters across one or more countries based on the user center location, the determined violation of one or more data residency regulations, cost of movement from one datacenter to another, and a predefined threshold latency, wherein the optimizing the placement of the received primary data and the associated data to at least one of the plurality of datacenters, comprises:
        selecting the one or more web services for a user and corresponding permissible cloud datacenters;
        ranking the permissible cloud data centers based on an allocation cost, a latency between a user center and a cloud datacenter;
        determining various combinations of the allocation cost and the latency between the user centre and the cloud datacenter based on ranking of the permissible cloud datacenters;
        evaluating the determined combinations based on the predefined threshold latency and allocation cost constraints;
        determining an optimized combination of the allocation cost and the latency between the user center and the cloud datacenter; and
        generating one or more allocation combinations based on the optimized combination, wherein the allocation combination hosts a web service serving the user center to at least one of the plurality of datacenters.

2. The processor-implemented method of claim 1, wherein the conditional one or more data residency regulations allow to host a web service handling the associated data from a cloud datacenter located in the one or more countries.

3. The processor-implemented method of claim 1, wherein the one or more data residency regulations includes one or more attributes of strict localization, conditional transfer, and directing to a mutual arrangement among the one or more countries.

4. The processor-implemented method of claim 1, wherein the predefined threshold latency is total response time of a service between a user center and a cloud data center.

5. A system for optimizing placement of data to at least one of a plurality of cloud datacenters complying one or more data residency regulations comprising:
- an input/output interface to receive a primary data and corresponding associated data hosted on one or more web-services which are spread across a plurality of data centers across one or more countries, wherein the primary data comprises of customers data, employees data, and vendors information;
- a memory in communication with the one or more hardware processors, wherein the one or more hardware processors are configured to execute programmed instructions stored in the memory to:
  - analyze the received primary data to determine locale corresponding to the primary data based on at least one of nationality, residence, and subject to jurisdiction;
  - analyze the received associated data corresponding to the primary data to determine nature of the associated data, wherein the nature of the associated data includes Personal Identifiable Information (PII), financial data, healthcare data, telecom data, and government data;
  - fetch one or more data residency regulations based on the identified locale of the primary data, the determined nature of the associated data and a user center location, wherein the data residence regulations are conditional as well as unconditional depend on the nature of the associated data;
  - assess in-country, and out-country placement status of the received primary data and the associated data based on the fetched one or more data residency regulations to determine a violation of one or more data residency regulations; and
  - optimize the placement of the received primary data and the associated data to at least one of the plurality of datacenters across one or more countries based on the user center location, the determined violation of one or more data residency regulations, cost of movement from one datacenter to another, and a predefined threshold latency, wherein the optimizing the placement of the received primary data and the associated data to at least one of the plurality of datacenters, comprises:
    - selecting the one or more web services for a user and corresponding permissible cloud datacenters;
    - ranking the permissible cloud data centers based on an allocation cost, a latency between a user center and a cloud datacenter;
    - determining various combinations of the allocation cost and the latency between the user centre and the cloud datacenter based on ranking of the permissible cloud datacenters;
    - evaluating the determined combinations based on the predefined threshold latency and allocation cost constraints;
    - determining an optimized combination of the allocation cost and the latency between the user center and the cloud datacenter; and
    - generating one or more allocation combinations based on the optimized combination, wherein the allocation combination hosts a web service serving the user center to at least one of the plurality of datacenters.

6. The system of claim 5, wherein the conditional data residency regulation allows to hot a web service handling the associated data from a datacenter located in the one or more countries.

7. The system of claim 5, wherein the data residence regulations include one or more attributes of strict localization, conditional transfer, and directing to a mutual arrangement among the one or more countries.

8. The system of claim 5, wherein the predefined threshold latency is total response time of a service between a user center and a cloud data center.

9. A non-transitory computer readable medium storing one or more instructions which when executed by one or more processors on a system, cause the one or more processors to perform method comprising:
- receiving, via an input/output interface, a primary data and corresponding associated data hosted on one or more web-services which are spread across a plurality of data centers across one or more countries, wherein the primary data comprises of customers data, employees data, and vendors information;
- analyzing, via one or more hardware processors, the received primary data to determine locale corresponding to the primary data based on at least one of nationality, residence, and subject to jurisdiction;
- analyzing, via a one or more hardware processors, the received associated data corresponding to the primary data to determine nature of the associated data, wherein the nature of the associated data includes Personal Identifiable Information (PII), financial data, healthcare data, telecom data, and government data;
- fetching, via the one or more hardware processors, one or more data residency regulations based on the identified locale of the primary data, the determined nature of the associated data and a user center location, wherein the data residence regulations are conditional as well as unconditional depend on the nature of the associated data;
- assessing, via the one or more hardware processors, in-country, and out-country placement status of the received primary data and the associated data based on the fetched one or more data residency regulations to determine a violation of one or more data residency regulations; and
- optimizing, via the one or more hardware processors, the placement of the received primary data and the associated data to at least one of the plurality of datacenters across one or more countries based on the user center location, the determined violation of one or more data residency regulations, cost of movement from one datacenter to another, and a predefined threshold latency, wherein the optimizing the placement of the received primary data and the associated data to at least one of the plurality of datacenters, comprises:
  - selecting the one or more web services for a user and corresponding permissible cloud datacenters;
  - ranking the permissible cloud data centers based on an allocation cost, a latency between a user center and a cloud datacenter;
  - determining various combinations of the allocation cost and the latency between the user centre and the cloud datacenter based on ranking of the permissible cloud datacenters;

evaluating the determined combinations based on the predefined threshold latency and allocation cost constraints;

determining an optimized combination of the allocation cost and the latency between the user center and the cloud datacenter; and generating one or more allocation combinations based on the optimized combination, wherein the allocation combination hosts a web service serving the user center to at least one of the plurality of datacenters.

* * * * *